(12) United States Patent
Schuetze et al.

(10) Patent No.: US 11,454,233 B2
(45) Date of Patent: Sep. 27, 2022

(54) DEVICE FOR PROVIDING A PNEUMATIC PRESSURE MEDIUM BY MEANS OF A PRESSURE MEDIUM SOURCE FOR AT LEAST ONE PRESSURE MEDIUM CHAMBER OF A VEHICLE SEAT OF A MOTOR VEHICLE IN PARTICULAR

(71) Applicant: CONTINENTAL AUTOMOTIVE GMBH, Hannover (DE)

(72) Inventors: Thomas Schuetze, Paunzhausen (DE); Klaus Spreng, Ingolstadt (DE); Stefan Bauer, Engelbrechtsmuenster (DE); Jan Sedenka, Ostrava (CZ)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/332,186

(22) PCT Filed: Sep. 5, 2017

(86) PCT No.: PCT/EP2017/072216
§ 371 (c)(1),
(2) Date: Mar. 11, 2019

(87) PCT Pub. No.: WO2018/046486
PCT Pub. Date: Mar. 15, 2018

(65) Prior Publication Data
US 2019/0263305 A1 Aug. 29, 2019

(30) Foreign Application Priority Data
Sep. 9, 2016 (DE) .................. 10 2016 217 252.2

(51) Int. Cl.
*F04B 45/047* (2006.01)
*F04B 35/04* (2006.01)
(Continued)

(52) U.S. Cl.
CPC ............ *F04B 45/047* (2013.01); *A47C 7/467* (2013.01); *B60N 2/665* (2015.04); *B60N 2/914* (2018.02);
(Continued)

(58) Field of Classification Search
CPC ........ F04B 43/04; F04B 45/047; A47C 7/467; A61H 2201/1207; Y10T 137/3584
See application file for complete search history.

(56) References Cited

U.S. PATENT DOCUMENTS 4,634,179 A 1/1987 Hashimoto et al.
5,529,377 A 6/1996 Miller
(Continued)

FOREIGN PATENT DOCUMENTS

CN 101396994 A 4/2009
CN 102381218 B 10/2012
(Continued)

*Primary Examiner* — Atif H Chaudry
(74) *Attorney, Agent, or Firm* — Laurence A. Greenberg; Werner H. Stemer; Ralph E. Locher

(57) ABSTRACT

A device provides a pneumatic pressure medium via a pressure medium source for at least one pressure medium chamber in particular of a vehicle seat of a motor vehicle. The device has a pressure medium source for the pressure medium and a pressure medium line disposed between the pressure medium source and at least one valve. At least one connection for a pressure medium line is disposed between the valve and the pressure medium chamber. A control module actuates the pressure medium source and the at least one valve. The device further has a housing. A motor of the pressure medium source is located between the control module and a pump of the pressure medium source.

18 Claims, 5 Drawing Sheets

(51) Int. Cl.
*F04B 49/02* (2006.01)
*F04B 43/04* (2006.01)
*A47C 7/46* (2006.01)
*B60N 2/66* (2006.01)
*B60N 2/90* (2018.01)

(52) U.S. Cl.
CPC .............. *F04B 35/04* (2013.01); *F04B 43/04* (2013.01); *F04B 49/02* (2013.01); *A61H 2201/1207* (2013.01); *Y10S 297/03* (2013.01); *Y10T 137/3584* (2015.04)

(56) References Cited

U.S. PATENT DOCUMENTS

| | | | |
|---|---|---|---|
| 7,902,781 B2 | 3/2011 | Beneker et al. | |
| 2009/0289510 A1* | 11/2009 | Muehlhausen | H01R 39/36 310/43 |
| 2013/0328459 A1* | 12/2013 | Blaser | H02K 1/2753 310/68 R |
| 2014/0232155 A1* | 8/2014 | Bocsanyi | A47C 4/54 297/284.6 |
| 2014/0318667 A1* | 10/2014 | Ebel | F17C 5/06 141/4 |
| 2015/0091401 A1* | 4/2015 | Buerger | H02K 5/15 310/71 |
| 2015/0122235 A1* | 5/2015 | Arita | H02K 21/44 123/565 |
| 2017/0208754 A1* | 7/2017 | Raszga | F15B 13/0433 |

FOREIGN PATENT DOCUMENTS

| | | |
|---|---|---|
| CN | 103347735 A | 10/2013 |
| CN | 103991396 A | 8/2014 |
| CN | 104604109 A | 5/2015 |
| DE | 10063478 A1 | 7/2002 |
| DE | 102004047165 B4 | 7/2010 |
| DE | 102014004863 A1 | 10/2015 |
| DE | 102015000115 A1 | 7/2016 |
| FR | 2906985 A3 | 4/2008 |
| JP | H0420305 A | 1/1992 |

\* cited by examiner

DEVICE FOR PROVIDING A PNEUMATIC PRESSURE MEDIUM BY MEANS OF A PRESSURE MEDIUM SOURCE FOR AT LEAST ONE PRESSURE MEDIUM CHAMBER OF A VEHICLE SEAT OF A MOTOR VEHICLE IN PARTICULAR

BACKGROUND OF THE INVENTION

Field of the Invention

The invention relates to methods and devices for providing a pneumatic pressure medium by means of a pressure medium source for at least one pressure medium chamber in particular of a vehicle seat of a motor vehicle.

SUMMARY OF THE INVENTION

One object of the invention is to optimize a pressure medium supply for at least one pressure medium chamber (bladder chamber) in particular of a vehicle seat. The object is respectively achieved by the subjects of the independent patent claims. Some particularly advantageous refinements of the invention are specified in the dependent claims and the description. Refinements of the invention can, as alternatives to existing solutions, render possible efficient mechanical connection of the motor of the pressure medium source to a control module (in particular in the form of a circuit board).

With respect to some refinements of the invention according to the subclaims:

according to refinements of the invention, the motor can be located between the pump and the control module (in particular in the form of a printed circuit board) (that is to say can be located in particular spatially therebetween and/or can be arranged spatially therebetween).

According to refinements of the invention, an arrangement of an interference-suppression device, in particular of interference-suppression capacitors, can be provided on the control module (in particular in the form of a circuit board).

Further features and advantages of some advantageous refinements of the invention can be found in the following description of some exemplary embodiments of the invention with reference to the drawing.

BRIEF DESCRIPTION OF THE SEVERAL VIEWS OF THE DRAWING

In said drawing, to illustrate some possible refinements of the invention, in a schematically simplifying manner.

DESCRIPTION OF THE INVENTION

Figure 1:
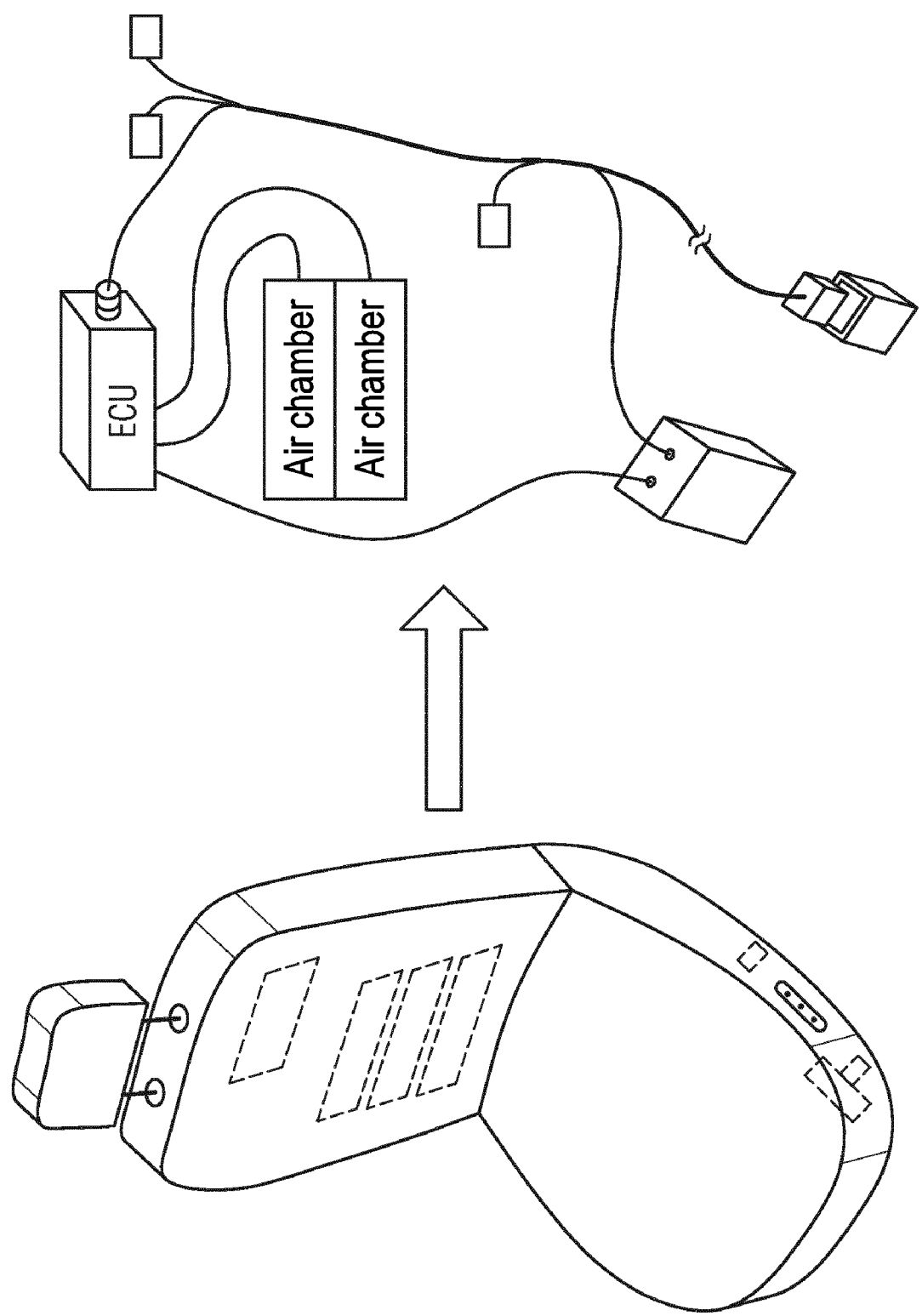
FIG. 1 shows at least internally known vehicle seat pressure medium chambers which are filled with pressure medium by way of a compressor.

FIG. 1 shows at least internally known vehicle seat pressure medium chambers which are filled with pressure medium by way of a compressor, wherein the individual pneumatic components are located in different positions and are connected to one another and also to the vehicle by way of the seat cable harness.

Figure 2:
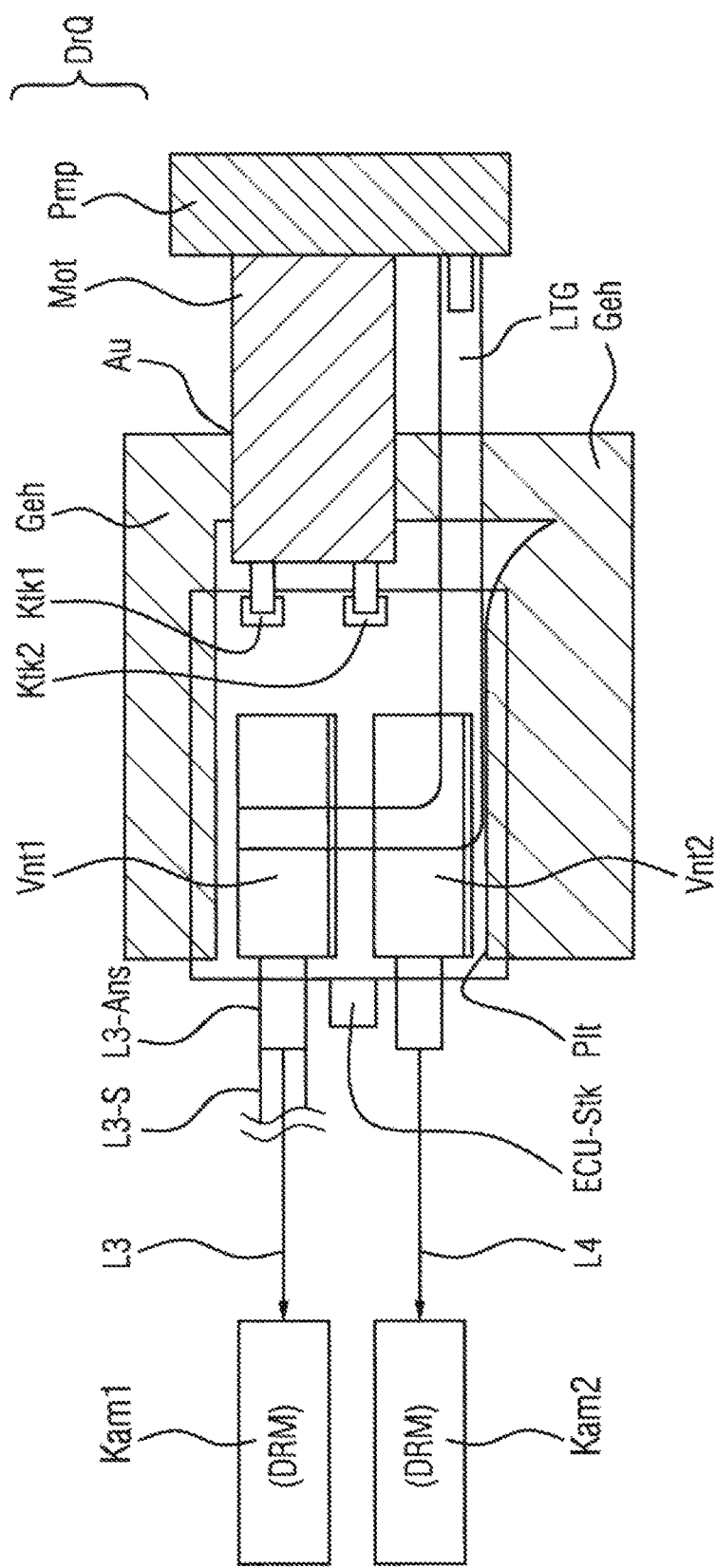
FIG. 2 shows, with respect to one refinement of the invention, a (longitudinal) section through pressure medium chambers which can in each case be filled with a pressure medium by means of a motor (which rests against a control module) of a pressure medium source by way of a feed line, a valve and a pressure medium line.

FIG. 2 shows, by way of example with respect to one refinement of the invention, a section through pressure medium chambers Kam3, Kam4 which can in each case be filled with a pressure medium DRM (for example air from the surrounding area or another gas) by means of a pressure medium source DrQ; Mot, Pmp by way of one of a plurality of feed lines L3, L4, by way of a respective valve Vnt1, Vnt2 and by way of a pressure medium line LTG. Pressure medium line LTG runs from the pressure medium source DrQ; Mot, Pmp to at least one valve Vnt1, Vnt2, and can be connected to a pressure medium chamber Kam3, Kam4, and/or to the controller Plt along motor Mot and/or along a side of the motor Mot and/or parallel to a rotor of the motor Mot. The valves Vnt1, Vnt2 and/or the motor Mot (which drives a pump Pmp etc.) of the pressure medium source DrQ can be actuated by a controller Ctrl (for example at a control module in the form of a printed circuit board Plt) which can be located, for example, on a circuit board Plt in a housing Geh and/or can be located in a (central) controller of a motor vehicle Kfz (which controller can actuate/render possible actuation of valves and/or the motor for example when operation of control knobs for seat adjustment (for example with lordosis supports) is detected).

In the refinement illustrated by way of example in FIG. 2, the control module in the form of a printed circuit board Plt and the valves Vnt1, Vnt2 are arranged in a housing Geh.

As in FIG. 2, according to one refinement of the invention, the motor Mot or in particular a subregion of the motor Mot can be arranged in the housing Geh. For example, a subregion of the motor Mot can run through a recess Au in the housing Geh from (on the right in FIG. 2) outside the housing Geh to (on the left in FIG. 2) inside the housing Geh.

As in FIG. 2, according to one refinement of the invention, a pump Pmp and/or a so-called compressor head of a pressure medium source DrQ (here a compressor) can be arranged outside the housing Geh, in particular can be arranged entirely outside the housing Geh.

As in FIG. 2, according to one refinement of the invention, a pump Pmp and/or a so-called compressor head of a pressure medium source DrQ (here a compressor) can be located on another (in particular opposite) side of the motor Mot (of the pressure medium source DrQ) to the control module Plt (that is to say, for example, the printed circuit board (circuit board) Plt). For example, in FIG. 2, the control module in the form of a printed circuit board Plt is arranged to the left of the motor Mot and the pump is arranged to the right of the motor Mot.

As in FIG. 2, according to one refinement of the invention, the pump Pmp and/or the so-called compressor head of a pressure medium source DrQ can (possibly nevertheless) be integrally formed with the motor, for example by soldering or welding or screwing or pinning or latching-in etc.

In the refinement of the invention illustrated in FIG. 2, the housing (on a side which is opposite, for example, an opening for receiving the motor Mot, on the left in FIG. 2) has openings for pressure medium lines L3, L4 which in each case connect a valve Vnt1, Vnt2 to a pressure medium chamber Kam1, Kam2, for example by way of a coupling connection piece L3-Ans (for a hose L3-S) on which the hose L3-S is fixed.

In the refinement of the invention illustrated in FIG. 2, the housing Geh, on one side (for example which has an opening for receiving the motor Mot) (on the right in FIG. 2), has an opening for a pressure medium line LTG which connects, for example, a valve Vnt1, Vnt2 to the pump Pmp.

With the motor Mot running (for example in a manner actuated by a controller Ctrl) and with the valves Vnt1, Vnt2 open (for example in a manner actuated by a controller Ctrl), pressure medium (for example air drawn in from the surrounding area by the pump Pmp, or pressure medium from a reservoir into which it can flow back, for example when a pressure chamber is vented) can be pressed into the one or here plurality of pressure medium chambers Kam1, Kam2 which, as a result, can expand and/or shift and/or can change the surface/contour of a vehicle seat FZS of a motor vehicle Kfz, for example in the region of a lordosis support etc.

Here, the printed circuit board Plt, which is provided (in the housing Geh) for actuating the one valve Vnt1 or the plurality of valves Vnt1, Vnt2 (for example using a controller Ctrl), is connected to said valve or said valves by way of a respective electrical line ELV1, ELV2 for the purpose of actuating said valve or said valves.

For the purpose of actuating the pressure medium source DrQ (in particular the motor Mot for the pump Pmp), the printed circuit board Plt can further be connected to said pressure medium source (in particular directly to the motor Mot) by way of an electrical line ELM1, ELM2 for the purpose of actuating (Ctrl) said pressure medium source. The control module in the form of a printed circuit board Plt can have one or a plurality of contacts Ktk1, Ktk2 (for example plugs or sockets for connection of an electrical line ELM1, ELM2) for making contact with the motor (Mot).

Here, the control module Plt (in the form of a printed circuit board Plt) has a controller Ctrl (for example with one or a plurality of electronic components) for actuating the motor Mot of the pressure medium source and/or the at least one valve Vnt1, Vnt2.

According to one refinement of the invention, an interference-suppression device for interference suppression, for example in the motor Mot, can be arranged at (for example on or in) the control module Plt (here in the form of a printed circuit board Plt), in particular an interference-suppression device comprising at least one (interference-suppression) capacitor C1, C2.

According to one refinement of the invention, a (direct) mechanical connection of the control module Plt (here in the form of a printed circuit board Plt) to the motor Mot (itself) of the pressure medium source DrQ can be provided. Said connection can comprise, for example, a recess Au for receiving the motor Mot in the housing Geh and/or other connections, such as, for example, screwing, adhesive bonding, welding, riveting, latching connections etc.

The housing Geh can be constructed, for example, from a suitable material which can ensure secure mechanical connection between the printed circuit board Plt of the control device Ctrl and the motor Mot. The control module Plt (here in the form of a printed circuit board Plt) has, for example, one or a plurality of corresponding receiving points (Ktk1, Ktk2) at which the motor Mot of the compressor DrQ can be directly contacted and/or (possibly additionally) mechanically fixed.

The pump Pmp which is driven by the motor Mot can be, for example, integrally formed with said motor (as compressor head).

In the refinement illustrated in FIG. 2, the motor Mot is located between the pump Pmp and the control module Plt (here in the form of a printed circuit board Plt) (that is to say located in particular spatially therebetween and/or arranged spatially therebetween). A pressure medium line LTG runs from the pump Pmp to at least one valve Vnt1, Vnt2, which can be connected to a pressure medium chamber Kam1, Kam2, along the motor Mot and/or along a side of the motor Mot and/or along at least one edge length (length or width or height) of the motor Mot; in simple terms, one refinement could be described such that the pressure medium line LTG runs from the pump Pmp to at least one valve Vnt1, Vnt2, which can be connected to a pressure medium chamber Kam1, Kam2, and/or to the printed circuit board Plt or a connection element on the printed circuit board around the motor Mot.

Refinements of the invention can advantageously lead to no or fewer additional EMC measures being provided on the motor side, and/or to it being possible to dispense with further plugs with associated cabling, and/or a possibly lower installation space requirement being possible and/or a shorter fitting time being required during production.

The housing Geh can, as required, completely surround the compressor and/or possibly establish only one connection to the motor Mot. Since the compressor motor Mot is already connected to the printed circuit board Plt, an only, for example, single (electrical) connection ECU-Stk to a seat cable harness (which can be connected, for example, to a (CAN etc.) bus etc. of a motor vehicle Kfz) and/or a bus can be provided.

Figure 3:
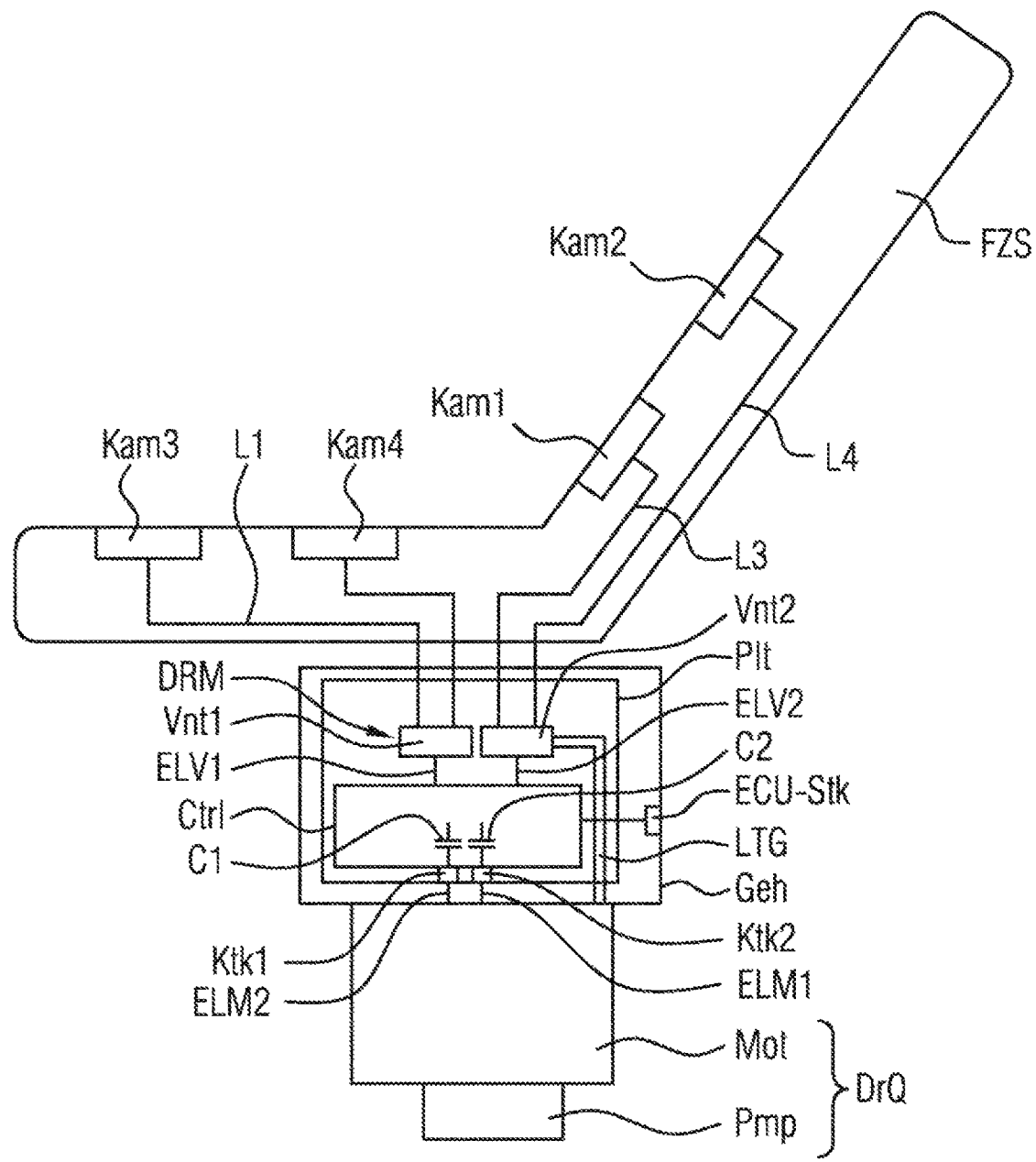
FIG. 3 shows, with respect to one refinement of the invention, a (longitudinal) section through a vehicle seat having pressure medium chambers which can in each case be filled with a pressure medium by means of a motor (which rests against a control module) of a pressure medium source by way of a feed line, a valve and a pressure medium line.

FIG. 3 shows, by way of example with respect to one refinement of the invention, a section through a vehicle seat FZS comprising pressure medium chambers Kam1, Kam2, Kam3, Kam4 which can in each case be filled with a pressure medium DRM (for example air from the surrounding area or another gas or a liquid) by means of a pressure medium source DrQ; Mot, Pmp by way of one of a plurality of feed lines L1, L3, L4, by way of a respective valve Vnt1, Vnt2 and by way of a pressure medium line LTG. The valves Vnt1, Vnt2 and/or the motor Mot (which drives a pump Pmp etc.) of the pressure medium source DrQ can be actuated by a controller Ctrl which can be located on a circuit board Plt in a housing Geh and/or can be located in a (central) controller of a motor vehicle Kfz.

Figure 4:
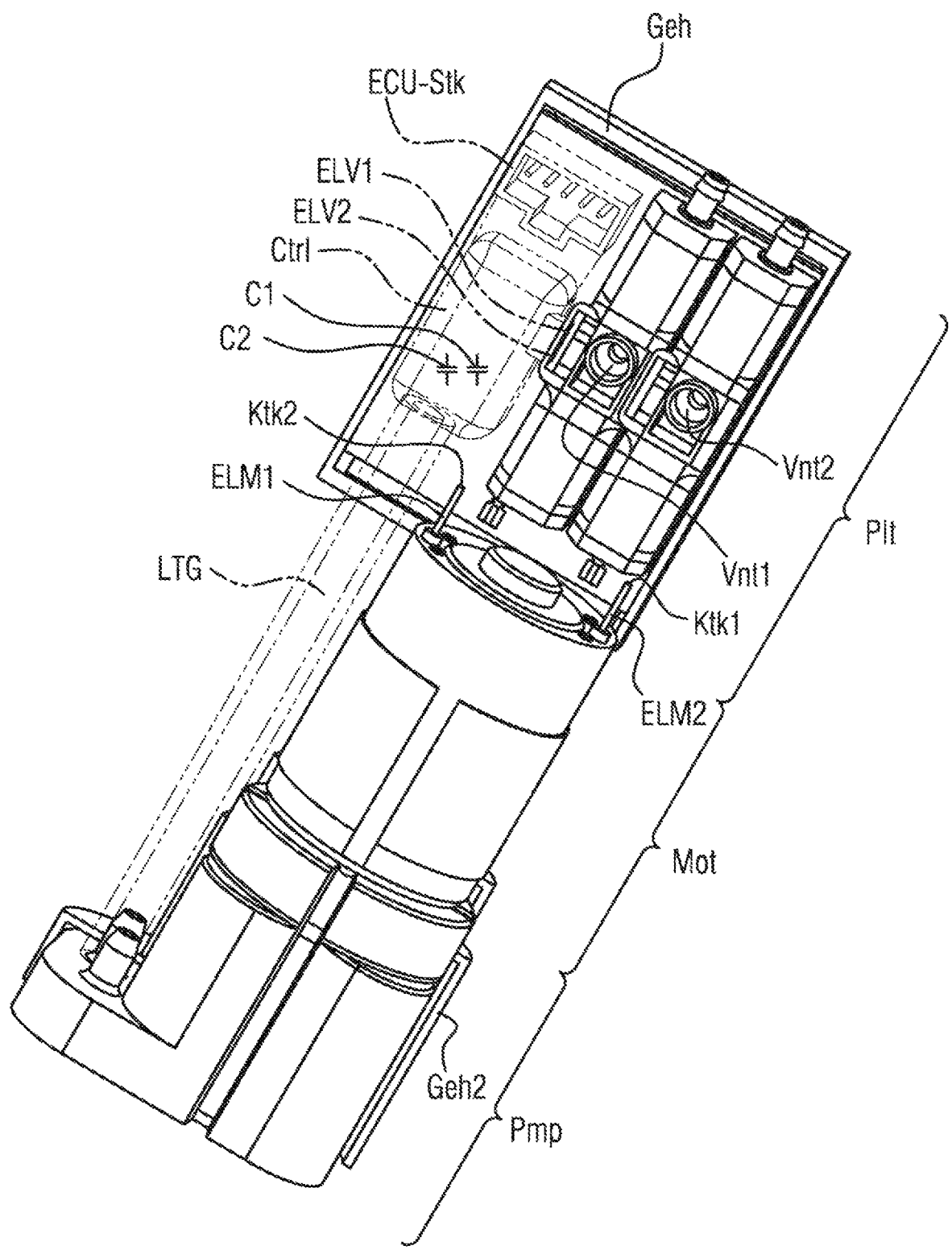
FIG. 4 shows a cross section with respect to one refinement of the invention.

FIG. 4 shows a partial cross section (in the region of the housing; and respectively a plan view in the region of the motor and of the pump) with respect to one refinement of the invention, comprising one housing Geh (which is fastened to the motor Mot) around the printed circuit board Plt and the valves and one housing Geh2 around the pump Pmp.

Figure 5:
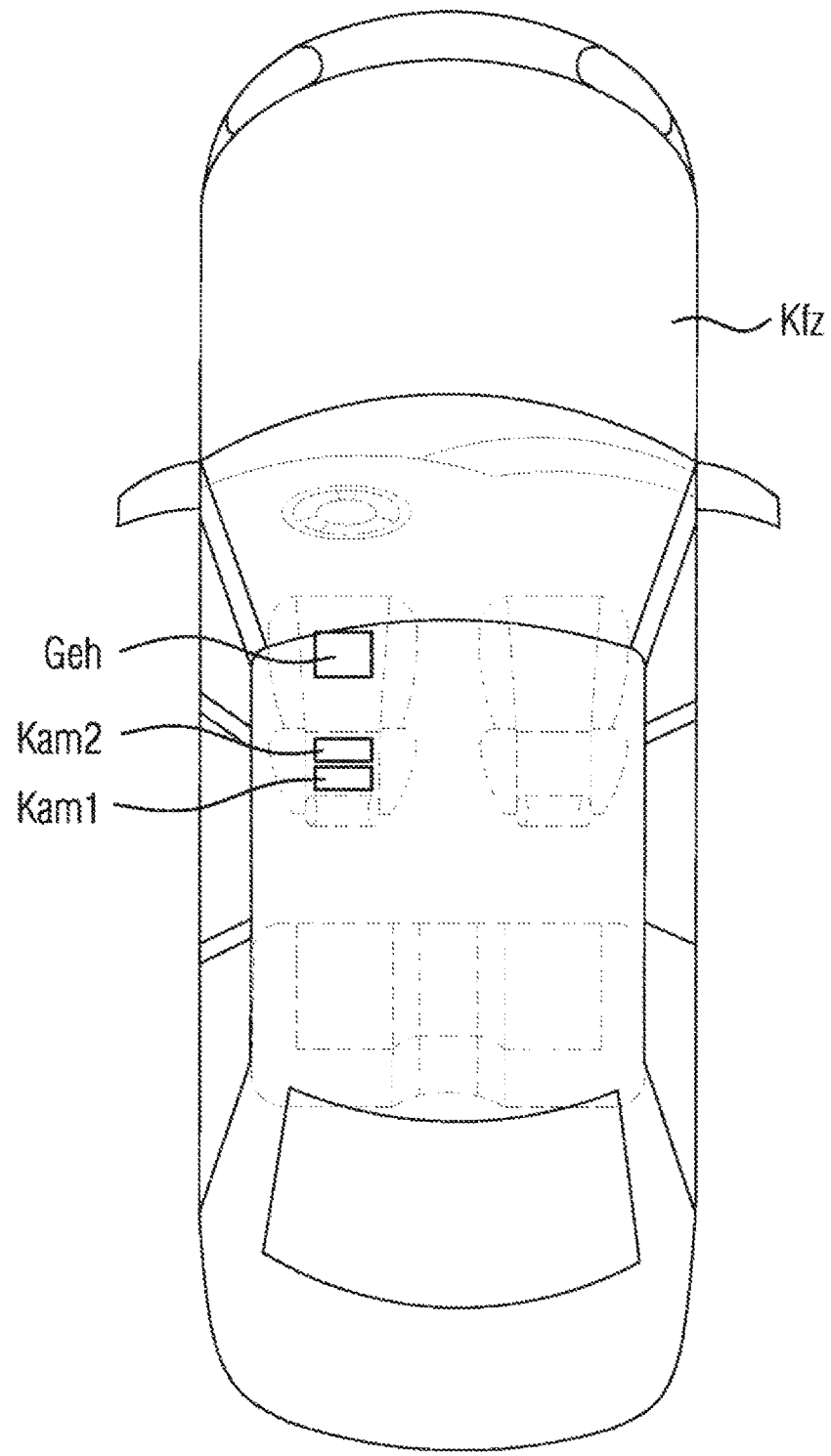
FIG. 5 shows, with respect to one refinement of the invention, a section through a motor vehicle having a vehicle seat comprising pressure medium chambers and a pressure medium supply.

FIG. 5 shows, with respect to one refinement of the invention, a section through a motor vehicle Kfz having a vehicle seat FZS comprising pressure medium chambers Kam1, Kam2 and a housing Geh of a pressure medium supply DRQ.

A pump Pmp within the meaning of the application can be, for example, in particular any kind of compressor, examples of some known variants including: piston compressor, screw compressor, turbo compressor, transonic compressor, liquid ring pump, reciprocating-piston compressor, ionic compressor, lamella compressor, rotary compressor, wobble plate compressor, labyrinth piston compressor, Roots blower, swashplate compressor, scroll compressor, free piston compressor, diaphragm compressor, side channel compressor, open, hermetic, semihermetic compressor etc.

The invention claimed is:

1. A device for providing a pneumatic pressure medium to a pressure medium chamber, the device comprising:
   a housing containing at least one valve and a printed circuit board carrying a controller;
   a pressure medium source for the pneumatic pressure medium including a motor and a pump driven by said motor, said pump being integrally formed with said motor;
   at least a portion of said motor being disposed in said housing and resting against said printed circuit board, said motor having a direct mechanical connection to said printed circuit board inside said housing;
   said motor being disposed between said printed circuit board and said pump;
   a pressure medium line extending between said pressure medium source and said at least one valve, said pressure medium line running from said pump, along a side of said motor parallel to a rotor of said motor, into said housing and to said at least one valve;
   at least one connection between said at least one valve and the pressure medium chamber; and
   the device having only a single electrical connection to a seat cable harness.

2. The device according to claim 1, wherein said controller is in a form of a printed circuit board and/or a circuit board for actuating said pressure medium source and said at least one valve.

3. The device according to claim 1, wherein:
   said pump is driven by said motor.

4. The device according to claim 1, wherein said controller is disposed on an opposite side of said motor of said pressure medium source then said pump of said pressure medium source.

5. The device according to claim 1, wherein said motor of said pressure medium source is disposed spatially between said controller and said pump of said pressure medium source.

6. The device according to claim 1, wherein said pump is disposed outside said housing.

7. The device according to claim 1,
   further comprising a further pressure medium line for supplying the pneumatic pressure medium; and
   wherein said pressure medium line runs from said pump of said pressure medium source to said at least one valve which is pneumatically connected to said pressure medium source by said further pressure medium line for supplying the pneumatic pressure medium.

8. The device according to claim 1,
   further comprising an electrical line; and
   wherein said controller is a printed circuit board configured to actuate said at least one valve and is disposed in said housing and/or is connected to said at least one valve by way of said electrical line for actuating said at least one valve.

9. The device according to claim 1,
   further comprising an electrical line; and
   wherein said controller is configured for actuating said motor of said pressure medium source and/or is connected to said motor by way of said electrical line for actuating said motor.

10. The device according to claim 1, wherein said controller has a subcontroller for actuating said pressure medium source and/or said at least one valve.

11. The device according to claim 1, wherein said controller has contacts for making contact with said motor.

12. The device according to claim 1,
    wherein said housing has a recess formed therein;
    further comprising contact-making means selected from the group of welding, adhesive bonding, screwing, pinning, soldering, riveting and casting-on; and
    an applied mechanical connection of said controller to said motor of said pressure medium source is provided, by said recess in said housing and/or said contact-making means.

13. The device according to claim 1, further comprising a pressure medium line disposed between said valve and said pressure medium chamber and having a connection and/or a hose.

14. The device according to claim 1, wherein said interference-suppression device has at least one capacitor.

15. A vehicle seat, comprising:
    at least one pressure medium chamber; and
    the device according to claim 1.

16. A motor vehicle, comprising:
    the vehicle seat according to claim 15.

17. A method for providing a pneumatic pressure medium for at least one pressure medium chamber of a vehicle seat of a motor vehicle, which comprises the steps of:
    providing a device including:
      a housing containing at least one valve and a printed circuit board carrying a controller;
      a pressure medium source for the pneumatic pressure medium including a motor and a pump driven by the motor, the pump being integrally formed with the motor;
      at least a portion of the motor being disposed in the housing and resting against the printed circuit board, the motor having a direct mechanical connection to the printed circuit board inside the housing;
      the motor being disposed between the printed circuit board and the pump;
      a pressure medium line extending between the pressure medium source and the at least one valve, the pressure medium line running from the pump, along a side of the motor parallel to a rotor of the motor, into the housing and to the at least one valve;
      at least one connection between the at least one valve and the pressure medium chamber; and
      the device having only a single electrical connection to a seat cable harness; and
    actuating the device to provide the pneumatic pressure medium for the at least one pressure medium chamber.

18. A device for providing a pneumatic pressure medium to a pressure medium chamber, the device comprising:
    a housing containing at least one valve and a printed circuit board carrying a controller;
    a pressure medium source for the pneumatic pressure medium including a motor and a pump driven by said motor, said pump being integrally formed with said motor;
    said motor being disposed between said printed circuit board and said pump;
    a pressure medium line extending between said pressure medium source and said at least one valve, said pressure medium line running from said pump, along a side of said motor parallel to a rotor of said motor, into said housing and to said at least one valve;

at least one connection between said at least one valve and the pressure medium chamber; and the device having only a single electrical connection to a seat cable harness.

\* \* \* \* \*